(12) United States Patent
Kunitake et al.

(10) Patent No.: US 7,249,496 B2
(45) Date of Patent: Jul. 31, 2007

(54) SYSTEM FOR INSPECTING UNIFORMITY OF TIRE

(75) Inventors: Hiroki Kunitake, Tokyo (JP); Takahiro Gotou, Tokyo (JP); Yoshihiro Murota, Tokyo (JP); Yoshiaki Hirata, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 10/530,714

(22) PCT Filed: Oct. 8, 2003

(86) PCT No.: PCT/JP03/12874

§ 371 (c)(1),
(2), (4) Date: Nov. 8, 2005

(87) PCT Pub. No.: WO2004/033191

PCT Pub. Date: Apr. 22, 2004

(65) Prior Publication Data

US 2006/0090557 A1  May 4, 2006

(30) Foreign Application Priority Data

Oct. 9, 2002  (JP) .............................. 2002-296361

(51) Int. Cl.
*G01M 17/02* (2006.01)
(52) U.S. Cl. ............................................ 73/146; 451/5
(58) Field of Classification Search .................. 73/146; 451/1, 5, 26, 28
See application file for complete search history.

(56) References Cited

U.S. PATENT DOCUMENTS

| 4,458,451 A | * | 7/1984 | Rogers et al. ................. 451/1 |
| 4,501,141 A | * | 2/1985 | Takayanagi et al. .......... 73/146 |
| 4,837,980 A | * | 6/1989 | Rogers, Jr. ..................... 451/5 |
| 5,052,218 A | * | 10/1991 | Iwama ........................ 73/146 |
| 5,616,859 A | | 4/1997 | Rhyne |
| 5,883,304 A | | 3/1999 | Kokubu et al. |
| 6,673,184 B1 | * | 1/2004 | Brown et al. ............... 156/133 |
| 6,786,800 B1 | * | 9/2004 | Delmoro et al. ............. 451/11 |

FOREIGN PATENT DOCUMENTS

| EP | 0 915 328 A | 5/1999 |
| JP | 7-100952 A | 4/1995 |

OTHER PUBLICATIONS

International Search Report PCT/JP2003/012874 dated Jan. 13, 2004.

* cited by examiner

*Primary Examiner*—Edward Lefkowitz
*Assistant Examiner*—Andre Allen
(74) *Attorney, Agent, or Firm*—Sughrue Mion, PLLC

(57) ABSTRACT

An uniformity inspection line 1 comprises a decision-only line 2 having first UF machines 2M exclusive for the measurement of the uniformity of a tire 12 sorted and distributed on an automatic sorting line 21 and a correction-only line 3 having second UF machines 3M for the correction and re-measurement of the uniformity characteristics of a tire having uniformity characteristics outside specific values measured on the above decision-only line 2. Since the measurement of uniformity and the correction and re-measurement of uniformity characteristics are performed in different systems, uniformity inspection can be carried out efficiently even when the number of tires whose uniformity characteristics are to be corrected is varied.

1 Claim, 3 Drawing Sheets

SYSTEM FOR INSPECTING UNIFORMITY OF TIRE

BACKGROUND OF THE INVENTION

1. Field of the Invention

The present invention relates to a uniformity inspection system for inspecting the uniformity characteristics of an assembled tire and correcting and re-inspecting the uniformity characteristics as required.

2. Description of the Prior Art

A product tire which has gone through a curing step and a finishing step is shipped after product inspections such as appearance and shape inspections and uniformity measurement are made.

As for the measurement of the uniformity of a tire, a tire 12 assembled with a rim is pressed against a rotating drum 11 corresponding to a road under load and turned while the axial distance between the tire 12 and the drum 11 is fixed as shown in FIG. 3(a) to measure a load variant (RFV), a longitudinal force variant (LFV) and a transverse force variant (TFV) as shown in FIG. 13(a), and displacement gauges 13a and 13b are pressed against the tread portion 12a and the side portion 12b of a rotating tire 12 to measure the size nonuniformity in the longitudinal direction (RR) and size nonuniformity in the transverse direction (LR) of the above tire 12 as shown in FIGS. 3(b) and 3(c).

When the above measured uniformity characteristics are within specified values, the tire is accepted and when they are outside the specified values, the assembly state of the tire with the rim is corrected, a size nonuniform portion or a projecting portion which causes the vibration of the tire is shaved off with a correction device such as a buff machine and then the uniformity characteristics of the corrected tire are re-measured.

FIG. 4 shows the outline of a conventional uniformity inspection line. The tires 12 which are sorted and distributed after an appearance inspection is made while they are carried on the conveyor 21C of an automatic sorting line 21 are supplied to a uniformity inspection line 22 having a plurality of uniformity inspection machines (to be referred to as "UF machines" hereinafter) 22M so as to measure their uniformity characteristics with the UF machines 22M.

The above UF machine 22M has a uniformity measuring function and a uniformity characteristics correction function. When the uniformity characteristics of the tire measured with the UF machine 22M are within specified values, the tire is carried to the subsequent step by the conveyor 23C of a conveyor line 23 as an accepted product. When the uniformity characteristics of the tire are outside the specified values, after the above tire is corrected by an unshown correction machine such as a buff machine provided in the UF machine 22M, the uniformity characteristics of the corrected tire are re-measured. When the uniformity characteristics of the above corrected tire are within the specified values after the re-measurement, the tire is supplied to the subsequent step as an accepted product and when the uniformity characteristics are outside the specified values again, the tire is supplied to the collection conveyor 24C of a collection line 24 as an unaccepted product.

However, as for the number of the above UF machines 22M, only the minimum required number of UF machines 22 which differs according to such conditions as the number of tires to be produced, the number of different sizes of tires to be produced and the estimated number of tires whose uniformity characteristics are to be corrected are installed.

Therefore, when the number of tires whose uniformity characteristics are to be corrected greatly changes, an automatic line may not function properly. That is, the uniformity measurement time of the above UF machine 22M is almost fixed for the tires of each size but the uniformity characteristics correction time is several times longer than the above uniformity measurement time though it differs according to the size and uniformity characteristic values of the tire. Therefore, when the number of tires whose uniformity characteristics are to be corrected increases, the number of tires which can be processed by the UF machine 22M is reduced. Consequently, as the capacity of the automatic line is reduced by the overflow of the tires 12 to the automatic sorting line 21, the tires 12 on the above automatic sorting line 21 must be manually taken out and carried to a storage site temporarily so that the automatic line can function properly. When the load of the automatic line is reduced, the extra work of returning the above stored tires 12 to the automatic line is necessary.

It is an object of the present invention which has been made in view of the above problem of the prior art to provide a tire uniformity inspection system capable of carrying out uniformity inspection efficiently even when the number of tires whose uniformity characteristics are to be corrected changes.

SUMMARY OF THE INVENTION

The inventors of the present invention have conducted intensive studies and have found that even when the number of tires whose uniformity characteristics are to be corrected greatly changes, it is possible to keep the uniformity inspection line in operation without a delay by separating a uniformity measurement line from a uniformity characteristics correction and re-measurement line. The present invention has been accomplished based on this finding.

That is, according to a first aspect of the present invention, there is provided a tire uniformity inspection system which comprises uniformity inspection devices, measures the uniformity characteristics of a tire input into an inspection line and corrects and re-measures the uniformity characteristics of a tire when the uniformity characteristics of the measured tire are outside specified values, wherein a decision-only line having only a uniformity measurement function and comprising first uniformity inspection devices for inspecting the uniformity of a newly input tire and a correction-only line having both of a uniformity measurement function and a uniformity characteristics correction function and comprising second uniformity inspection devices for correcting a tire having uniformity characteristics which are judged as outside the specified values on the decision-only line and re-inspecting the uniformity characteristics of the corrected tire are provided separately.

DESCRIPTION OF THE PREFERRED EMBODIMENT

A preferred embodiment of the present invention will be described herein under with reference to the accompanying drawings.

In the following description, the same parts as in the prior art are given the same reference symbols.

Figure 1:
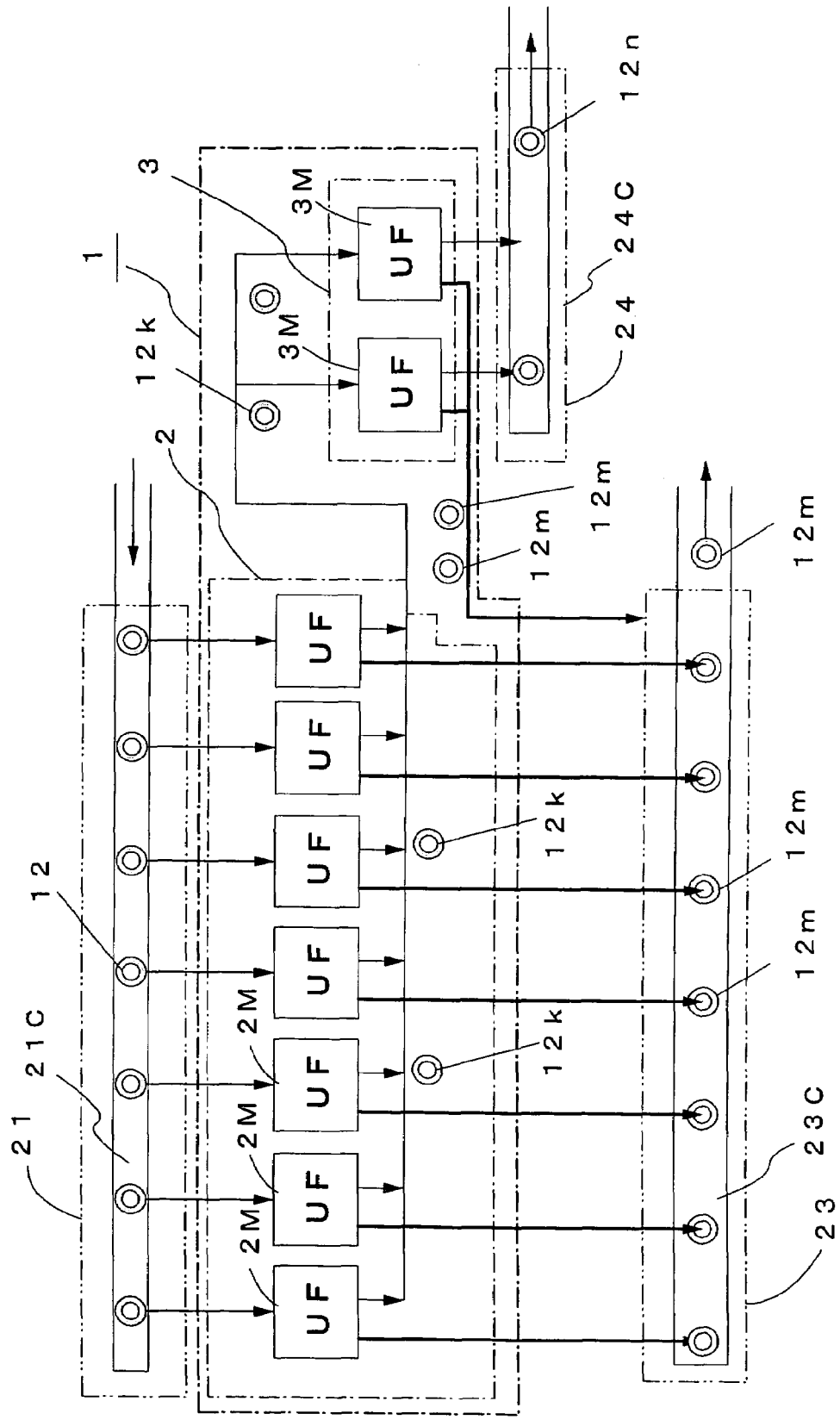
FIG. 1 is a diagram showing the constitution of a uniformity inspection line according to the present invention.

FIG. 1 is a diagram showing the outline of a uniformity inspection line according to the preferred embodiment of the present invention. Reference numeral 21 denotes an automatic sorting line for sorting/distributing and carrying tires 12 while an appearance inspection is made on the tires 12 on a conveyor 21, 1 a conformity inspection line having a decision-only line 2 having only a uniformity measurement function and comprising a plurality of first UF machines 2M for measuring and inspecting the uniformity of the above sorted and distributed tire 12 and a correction-only line 3 having a uniformity measurement function and a uniformity characteristics correction function and comprising a plurality of second UF machines 3M for correcting a tire 12k having uniformity characteristics which are judged as outside the specified values on the above decision-only line 2 and re-measuring and inspecting the uniformity characteristics of the corrected tire, 23 a conveyor line having a conveyor 23C for carrying tires 12m which have been judged as accepted products on the above decision-only line 2 and the correction-only line 3, and 24 a collection line having a collection conveyor 24C for collecting tires 12n which are judged as unaccepted products on the above correction-only line 3.

Figure 2:
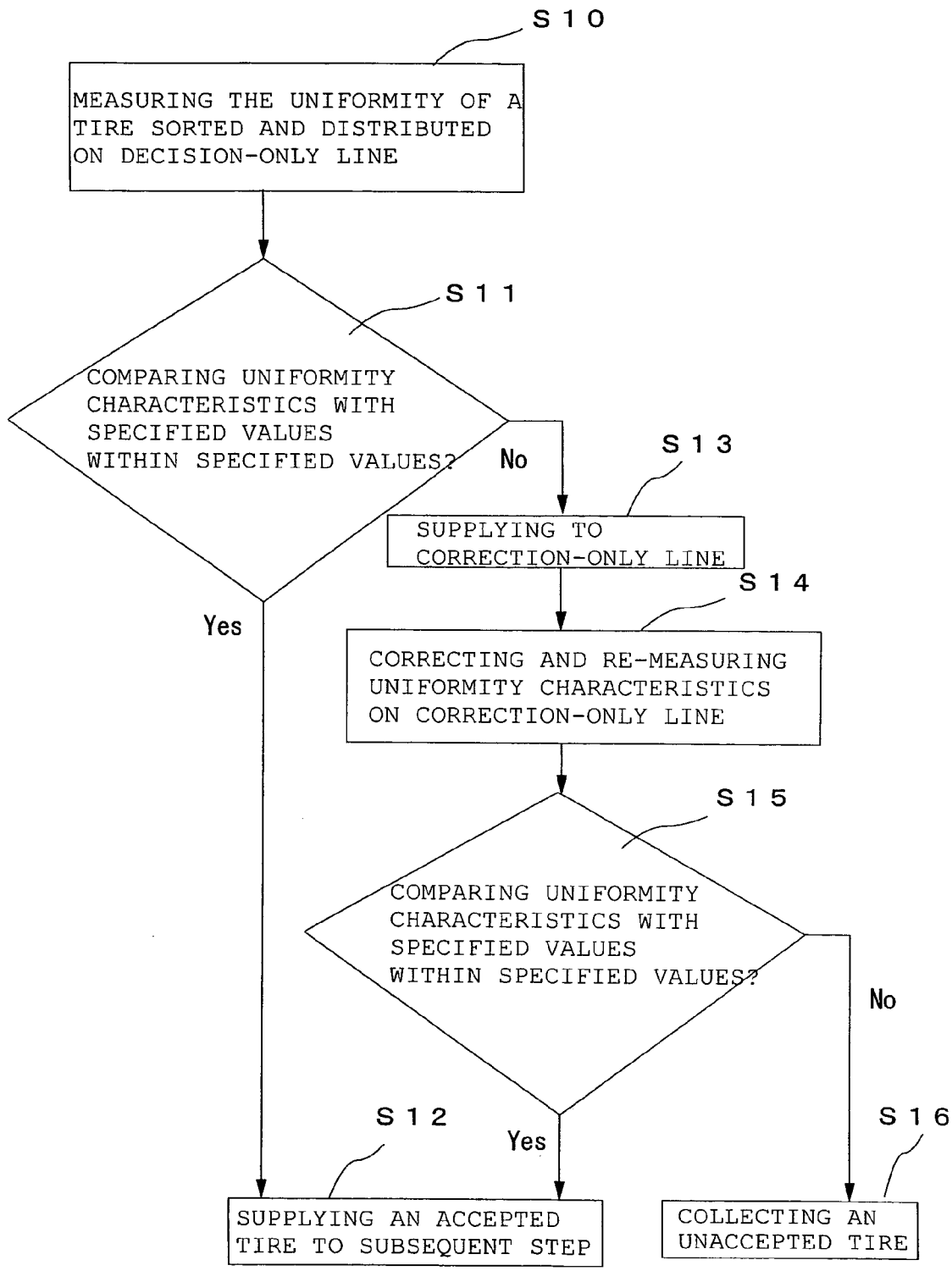
FIG. 2 is a flow chart showing the procedure of inspecting uniformity.
Figure 3A:
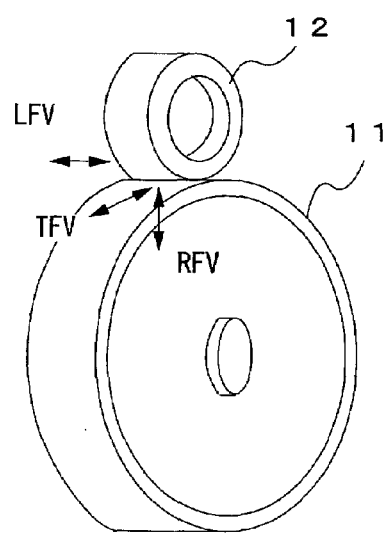
FIGS. 3a to 3c are diagrams showing a uniformity measurement method.
Figure 3B:
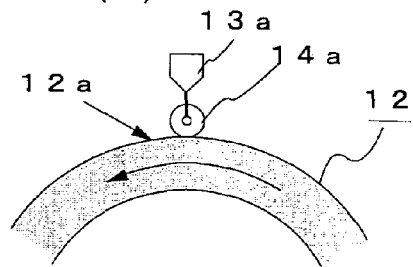
Figure 3C:
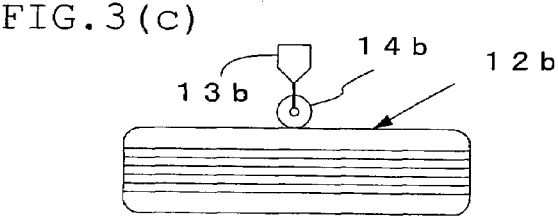
Figure 4:
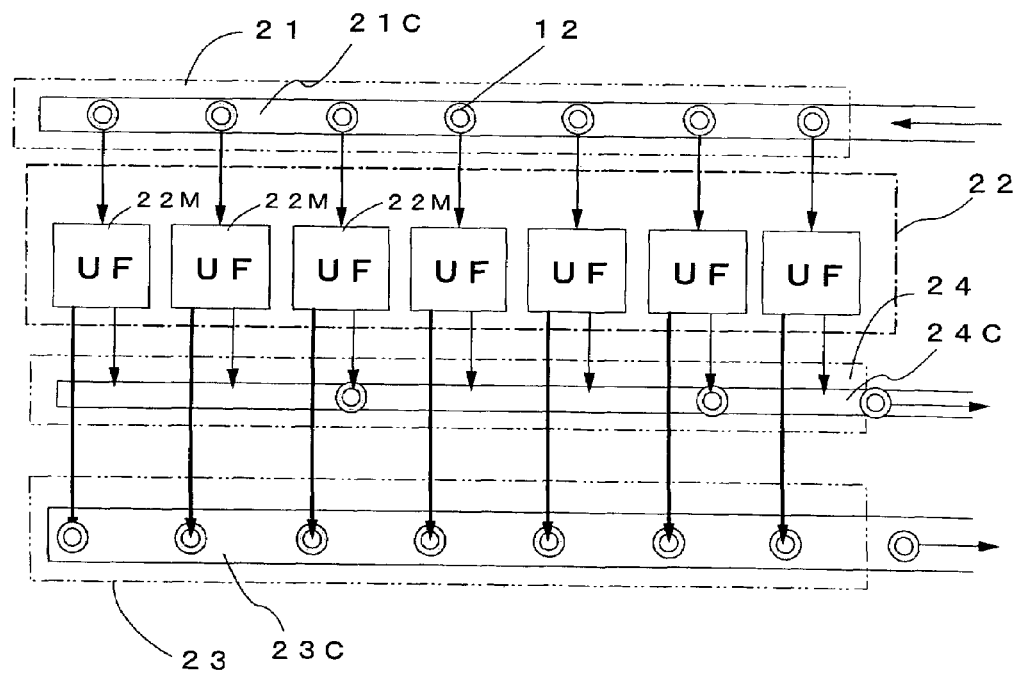
FIG. 4 is a diagram showing the constitution of a uniformity inspection line of the prior art.

A description is subsequently given of the procedure of inspecting uniformity in the present invention with reference to the flow chart of FIG. 2.

The tire 12 sorted and distributed by appearance inspection from the automatic sorting line 21 is supplied to the first UF machine 2M of the decision-only line 2 to measure the uniformity of the tire (step S10) so as to judge whether the uniformity characteristics of the tire are within the specified values or not (step S11). When the uniformity characteristics are within the specified values, the above tire is mounted on the conveyor 23C of the conveyor line 23 as an accepted tire 12m to be carried to the subsequent step (step S12).

When the uniformity characteristics are outside the specified values, the above tire 12k is supplied to the correction-only line 3 (step S13) to be corrected by the second UF machine 3M and the uniformity characteristics of the corrected tire are re-measured (step S14). It is then judged whether the uniformity characteristics of the above re-measured tire are within the above specified values or not (step S15). When the uniformity characteristics of the re-measured tire are within the specified values, the routine proceeds to step 12 to mount the above tire on the conveyor 23C of the conveyor line 23 as an accepted tire 12m and carry it to the subsequent step. When the uniformity characteristics are still outside the specified values after correction, the above tire is judged as an unaccepted tire 12n and mounted on the collection conveyor 24C of the collection line 24 to be carried to an unshown collection site (step S16).

According to this embodiment, the uniformity inspection line 1 comprises the decision-only line 2 having the first UF machines 2M only for the measurement of the uniformity of a tire 12 sorted and distributed on the automatic sorting line 21 and the correction-only line 3 having the second UF machines for correcting and re-measuring the uniformity characteristics of a tire 12k whose uniformity characteristics measured on the above decision-only line 2 are outside the specified values so that the measurement of uniformity and the correction and re-measurement of uniformity characteristics are carried out separately. Therefore, even when the number of tires whose uniformity characteristics are to be corrected greatly changes, the uniformity inspection line 1 can be kept in operation without a delay and a required number of tires can be processed stably.

The first UF machines 2M installed on the decision-only line 2 may have only a uniformity measurement function and a correction machine such as a buff machine is not necessary, thereby making it possible to simplify the constitution of the line.

In the above embodiment, all the tires whose uniformity characteristics are judged as outside the specified values on the decision-only line 2 are supplied to the correction-only line 3. The specified values may be each divided into some levels and all the tires whose uniformity characteristics are outside the respective predetermined levels may be supplied to the collection line 24 as unaccepted products. By dividing the specified values into several levels, the correction work of the correction-only line 3 can be carried out efficiently.

In the above embodiment, the correction of uniformity characteristics is carried out once. The present invention is not limited to this and a plurality of times of correction may be made according to the types of uniformity characteristics to be measured and the amount of a deviation from the specified value.

In the above embodiment, the UF machines of the decision-only line 2 are all the first UF machines 2M. One or more of the second UF machines 3M may be installed on part of the decision-only line 2. Thereby, when the number of tires to be inspected is smaller than the capacity of the line, the decision, correction and re-inspection of tires by using the second UF machines 3M of the above decision-only line 2 can be carried out without using the above correction-only line 3, thereby making it possible to improve work efficiency. When the number of tires to be corrected is large, the correction and re-inspection of the above tires can be carried out by using both of the second UF machines 2M of the decision-only line 2 and the second UF machines 3M of the correction-only line 3, thereby making it possible to carry out correction work more efficiently.

INDUSTRIAL FEASIBILITY

As having been described above, according to the present invention, since a decision-only line having only a uniformity measurement function and comprising uniformity inspection devices for measuring and judging the uniformity of a new tire and a correction-only line having a uniformity measurement function and a uniformity characteristics correction function and comprising uniformity inspection devices for correcting a tire having uniformity characteristics which are judged as outside the specified value on the above decision-only line and re-measuring and judging the uniformity characteristics of the corrected tire are provided separately in the uniformity inspection system, the measurement of the uniformity of a new tire and the correction and re-measurement of uniformity characteristics can be carried out separately.

Therefore, when the number of tires whose uniformity characteristics are to be corrected greatly changes, a required number of tires can be processed stably.

What is claimed is:

1. A tire uniformity inspection system comprising uniformity inspection devices having both a uniformity measurement function and a uniformity characteristics correction function, wherein the uniformity inspection devices measure the uniformity characteristics of a tire entered into an inspection line and when the uniformity characteristics of measured tire is outside a predetermined value, the uniformity inspection devices correct and re-measures the uniformity characteristics of the tire, wherein the tire uniformity inspection system further comprises the inspection line, wherein the inspection line further comprises a decision only line and a correction only line, wherein the decision only line comprises at least one uniformity inspection device having only a uniformity measurement function for inspecting the uniformity characteristics of the newly entered tire and for deciding whether the uniformity characteristics of the tire fall within the predetermined value, and the correction only line comprises at least one uniformity inspection device, wherein the uniformity inspection device has both a uniformity characteristics correction function and a uniformity measurement function and corrects a tire having at least one characteristic outside said predetermined value and re-inspects the uniformity characteristics of the corrected tire.

* * * * *